Figure 1:
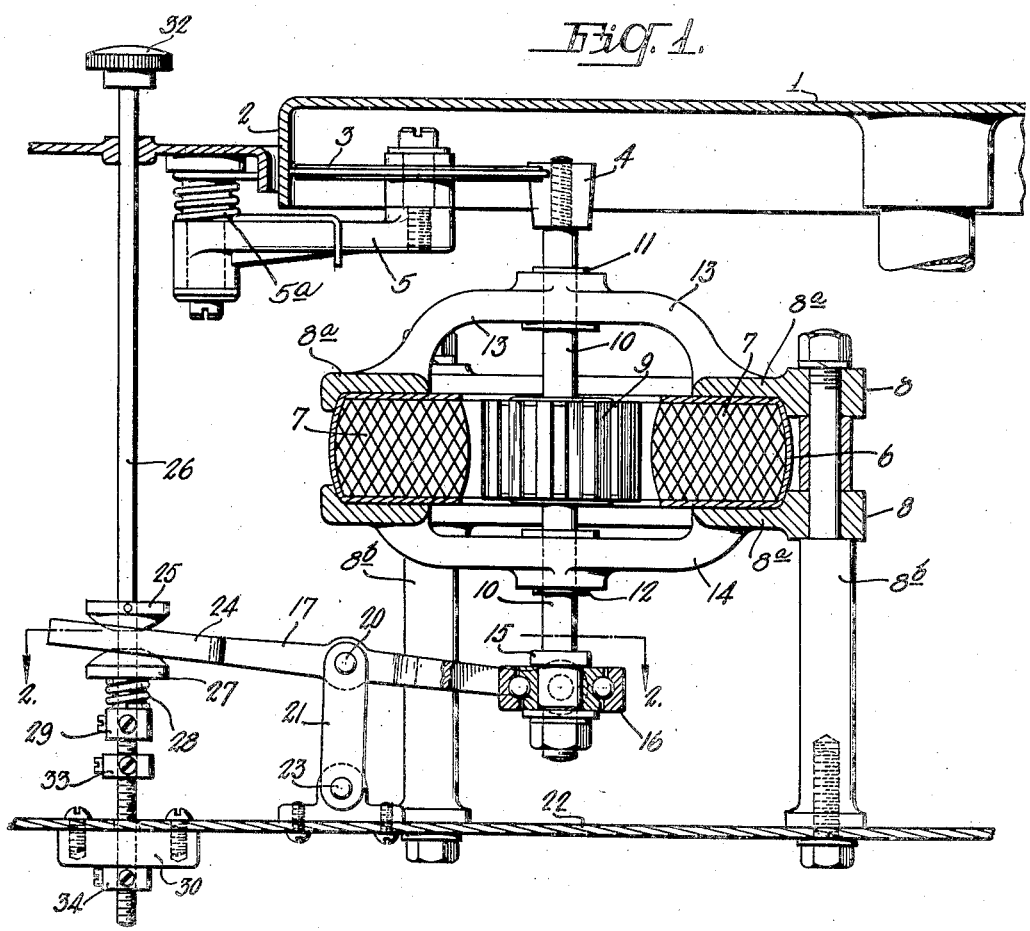

Aug. 7, 1945.  C. A. PITTMAN, JR  2,381,079
VARIABLE SPEED PHONOGRAPH DRIVE
Filed April 17, 1943

Inventor:-
Charles A. Pittman Jr.
by his Attorneys
Howson & Howson

Patented Aug. 7, 1945

2,381,079

UNITED STATES PATENT OFFICE 2,381,079

VARIABLE SPEED PHONOGRAPH DRIVE

Charles A. Pittman, Jr., Sellersville, Pa., assignor to Philco Radio and Television Corporation, Philadelphia, Pa., a corporation of Delaware Application April 17, 1943, Serial No. 483,430

9 Claims. (Cl. 172—36)

This invention relates to variable speed drives, and more particularly to a novel drive for a phonograph turntable.

In modern phonographs, it is common practice to provide a depending peripheral flange on the phonograph turntable and to drive the turntable by means of a driving mechanism including an element frictionally engaging the said flange. One form of driving mechanism comprises an idler wheel engaging the turntable flange and an axially adjustable tapered pulley engaging the said wheel, the said pulley being keyed or splined to an axially fixed shaft driven by an electric motor having a substantially constant speed. By adjusting the tapered pulley along its shaft, the driving ratio is varied to vary the speed of the turntable.

A principal disadvantage of such a mechanism is that the spline connection of the tapered pulley to its shaft and the adjustment of the pulley relative to the shaft introduce complexity and tendencies to "hunt" and to produce noise.

A principal object of the present invention is to provide a simple speed control mechanism which eliminates the spline connection of the tapered pulley and the above-mentioned disadvantages thereof. According to this invention, the tapered pulley is axially fixed on the rotor shaft of the driving motor, and the entire shaft assembly is moved axially to vary the position of the pulley.

Another object of the invention is to reduce the taper of the driving pulley for a given speed variation range. Heretofore the degree of taper necessary for substantial speed variation has introduced certain disadvantages. As there is bound to be some vertical line contact between the idler wheel and the driving pulley, the taper of the pulley has caused some sliding movement between these elements, due to driving zones of the pulley surface traveling at different peripheral speds. This is known as "scrubbing" and causes wear. In some instances, the tapered surface has been curved or crowned axially of the pulley to reduce this action.

According to the present invention, at least a part of the speed variation is effected by a variation in torque of the driving motor, which is brought about by moving the rotor relative to the stator. This enables a reduction in the degree of taper of the driving pulley, and, hence, reduces the "scrubbing" action to a minimum. Furthermore, it simplifies the driving pulley and renders it less costly.

The reduction of taper of the driving pulley has the further advantage that it reduces wasteful components of force between the pulley and the idler wheel. The taper of the pulley necessarily results in axial thrust components between it and the idler wheel, and by reducing such components to a minimum, the present invention increases the efficiency of the driving mechanism.

Other objects and features of the invention will appear hereinafter.

Figure 2:
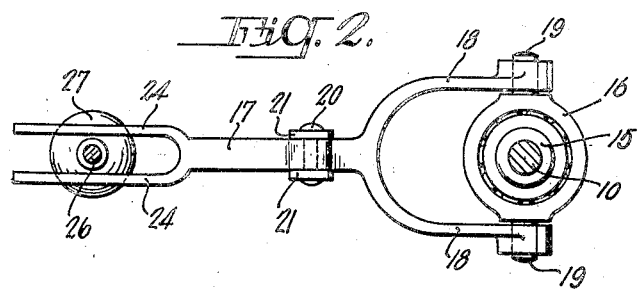

In the accompanying drawing:

Fig. 1 is an elevational view of a turntable drive mechanism embodying the invention, with some of the parts shown in section for the sake of illustration; and Fig. 2 is a view taken along line 2—2 of Fig. 1, showing the adjusting lever of the mechanism.

Referring to the drawing, there is shown the usual turntable 1 which is mounted for rotation in the usual manner and has a depending peripheral flange 2 by means of which it is driven. An idler wheel 3 frictionally engages the flange 2 and is driven by a driving pulley 4 having relatively small taper. Preferably, the wheel 3 is provided with a resilient rim of rubber or the like having a curved contact surface, as is customary in devices of this nature. The wheel 3 may be carried by a pivoted arm 5 which is urged by spring 5a in a direction to maintain the wheel in firm engagement with the flange 2 and the pulley 4. Such arrangement is a conventional one.

The driving motor 6, which is of the induction type, has its stator 7 fixedly mounted in any suitable manner, for example, by means of a mounting structure 8 comprising clamping rings 8a and supports 8b. The rotor 9 of the motor is mounted on a shaft 10 which is slidably held by bearings 11 and 12, which, in turn, may be supported by brackets 13 and 14 extending from the rings 8a. The slightly tapered pulley 4 is mounted on the upper end of the shaft 10.

The shaft assembly, including pulley 4 and rotor 9, is urged downward by gravity, and the pulley 4 tends to assume a position at which it will drive the idler wheel at maximum speed, and the rotor 9 tends to assume the position of maxmium torque, i. e., with the rotor centered with relation to the field, as shown. In addition to gravity, the magnetic forces within the motor tend to maintain the rotor fully within the stator field, which is the condition for maximum torque of the motor. Thus, there are two forces, gravity and the magnetic forces of the motor, tending to maintain the parts in the positions illustrated. In this condition of the mechanism, the turntable is driven at its maximum speed due to the driving ratio between the pulley 4 and the idler wheel and to the maximum torque exerted by the motor. By means of the structure now to be described, the mechanism may be manually adjusted to drive the turntable at various lower speeds.

At its lower portion, the shaft 10 has a flange 15, which rests upon a bearing 16 through which the shaft extends. Bearing 16 serves to support the shaft assembly while permitting free rotation thereof. The bearing 16 is supported by lever 17 whose arms 18 (see Fig. 2) are pivotally secured to the bearing by means of pins 19. Lever 17 is pivotally mounted at 20 upon a supporting arm 21, the lower end of which is pivotally mounted on the sub-panel 22 at 23. The purpose of this arrangement will appear presently.

The end of lever 17 opposite that attached to the bearing 16 is forked as at 24 and engages a conical collar 25 secured to a vertical rod 26. A second conical collar 27 is fitted to slide on rod 26 below the forked end 24 of lever 17 and is urged into engagement with the said forked end by a spring 28 engaged by a collar 29 on rod 26. Thus, the spring-urged conical collar 27 maintains the forked end 24 in engagement with the upper conical collar 25 throughout the adjustment range to be described presently.

Rod 26 is threaded at its lower portion and threadedly engages a block 30 affixed to the panel 22. The upper part of rod 26 extends through the horizontal panel 31 adjacent the turntable and is rotatably supported thereby. At its upper end, the rod carries a knob 32 by means of which it may be manually rotated. A pair of adjustable stops 33 and 34 are provided on the lower portion of rod 26 to limit its vertical movement in either direction.

Rotation of rod 26 by means of knob 32 causes the rod to move vertically by reason of its threaded engagement with the stationary block 30, thereby moving lever 17 about its pivot 20 and thus effecting vertical adjustment of the shaft assembly including the tapered pulley 4 and the rotor 9 of the driving motor. The structure and arrangement of the adjustable parts, as described above, enables vertical axial movement of the shaft assembly in response to rotation of knob 32.

As mentioned above, the parts of the mechanism are shown in the condition for maximum speed of the turntable. When it is desired to decrease the speed, knob 32 is rotated in a direction to lower rod 26 and thereby raise the driving shaft assembly. The variation in turntable speed is effected both by the change in the driving ratio due to adjustment of the tapered pulley 4 and by the change in the torque of the driving motor due to the axial movement of its rotor relative to its stator. Since a variation in motor torque is utilized to accomplish part of the speed variation, the pulley 4 is only slightly tapered. In other words, as previously mentioned, the present invention eliminates the necessity of a large degree of taper on the driving pulley and the difficulties incident thereto which have been set forth above.

Although the invention is useful where any vernier adjustment of speed is desired, it is particularly desirable in phonographs capable of recording as well as reproducing records, owing to the large variation of torque demand therein. In such case the device may be utilized to maintain the desired speed during recording, as well as to control speed during reproduction.

It is within the scope of the invention to employ a driving pulley having a uniform diameter and to rely entirely upon variation of the motor torque to effect the desired speed variation. However, it is preferred to employ the combination of a slightly tapered pulley and a variable torque motor, as this more readily enables the attainment of a substantial speed variation range.

Thus, it will be seen that the invention provides an extremely simple variable speed turntable drive mechanism which eliminates the spline connection of the driving pulley and which utilizes variation of the driving motor torque and makes possible the use of slight taper on the driving pulley with its attending advantages. It will be understood, of course, that the invention is not limited to the specific form illustrated, but is capable of various modifications within the scope of the appended claims.

I claim:

1. In a variable speed drive, a member to be driven, drive means for said member including an electrical driving motor having a stator and a rotor, said rotor being arranged for axial movement relative to said stator to vary the torque of the motor, and manually-operable means for adjusting the axial position of said rotor relative to said stator, to thereby vary the speed of the said member.

2. In a variable speed drive for a phonograph turntable or the like, drive means for the turntable including an induction motor having its rotor arranged for axial movement relative to its stator to vary the torque of the motor, and manually-operable means for adjusting the axial position of said rotor relative to said stator, to thereby vary the speed of the turntable.

3. In a variable speed drive, a member to be driven, drive means for said member including an electrical driving motor having a stator and a rotor, said motor having its axis of rotation disposed vertically and having its rotor arranged for axial movement relative to said stator to vary the torque of the motor, said rotor being urged to the position of maximum torque by gravity and the magnetic forces of the motor, and manually-operable means for moving said rotor relative to said stator to positions of lesser torque, to thereby vary the speed of said member.

4. In a variable speed drive, variable ratio drive means including an element adjustable to vary its driving ratio, an electrical driving motor arranged to drive said element, the rotor of said motor being axially movable relative to the stator to adjust said element and to vary the motor torque, said rotor being in the position of maximum torque when said adjustable element is in a position for maximum speed, and manually-operable means for adjusting the axial position of said rotor relative to said stator, to thereby vary both the position of said element and the torque of said motor.

5. In a variable speed drive, variable ratio drive means including a slightly tapered pulley providing adjustable driving ratio, an electrical driving motor arranged to drive said pulley, the rotor of said motor being axially movable relative to the stator to adjust said pulley and to vary the motor torque, said rotor being in the position of maximum torque when said pulley is in a position for maximum speed, and manually-operable means for adjusting the axial position of said rotor relative to said stator.

6. In a variable speed drive, variable ratio drive means including a slightly tapered pulley providing adjustable driving ratio and having its axis of rotation disposed vertically, an electrical motor axially aligned with said pulley, a shaft connecting said pulley to the rotor of said motor, said rotor being axially movable relative to the stator to adjust said pulley and to vary the motor torque, the connected pulley and rotor being urged downwardly by gravity and being urged by the magnetic forces of the motor to the position for maximum speed, and manually-operable means for effecting axial adjustment of said rotor relative to said stator.

7. In a variable speed drive for a phonograph turntable or the like having a depending peripheral flange, an idler wheel engaging said flange, a pulley having slight downward taper engaging said wheel, an electrical driving motor axially aligned with said pulley, a shaft connecting said pulley to the rotor of said motor, said rotor being axially movable relative to the stator to adjust said pulley and to vary the motor torque so as to vary the turntable speed, the rotor being in the position of maximum torque when said pulley is in a position for maximum speed of the turntable, and manually-operable means for moving said rotor and said pulley to various axial positions relative to said stator and said wheel.

8. In a variable speed drive for a phonograph turntable or the like having a depending peripheral flange, an idler wheel engaging said flange, a pulley having slight downward taper engaging said wheel, an electrical driving motor disposed below said pulley and axially aligned therewith, a shaft connecting said pulley to the rotor of said motor, said rotor being axially movable relative to the stator to adjust said pulley and to vary the motor torque so as to vary the turntable speed, the rotor being in the position of maximum torque when said pulley is in a position for maximum speed of the turntable, and manually-operable means for moving said rotor and said pulley to various axial positions relative to said stator and said wheel.

9. In a variable speed drive for a phonograph turntable or the like having a depending peripheral flange, an idler wheel engaging said flange, a pulley having slight downward taper engaging said wheel, an electrical driving motor disposed below said pulley and axially aligned therewith, a shaft connecting said pulley to the rotor of said motor, said rotor being axially movable relative to the stator to adjust said pulley and to vary the motor torque so as to vary the turntable speed, the rotor being in the position of maximum torque when said pulley is in a position for maximum speed of the turntable, a pivoted lever arm supporting the shaft-connected pulley and rotor assembly, and manually-operable means for adjusting said arm so as to move said rotor and said pulley to various axial positions relative to said stator and said wheel.

CHARLES A. PITTMAN, Jr.

DISCLAIMER 2,381,079.—*Charles A. Pittman, Jr.*, Sellersville, Pa. VARIABLE SPEED PHONOGRAPH DRIVE. Patent dated Aug. 7, 1945. Disclaimer filed Aug. 15, 1946, by the assignee, *Philco Corporation*.

Hereby enters this disclaimer to claims 1 and 2 of the said Letters Patent.

[*Official Gazette October 1, 1946.*]